United States Patent
Lee et al.

(10) Patent No.: US 8,325,316 B2
(45) Date of Patent: Dec. 4, 2012

(54) ELECTRO-WETTING DISPLAY DEVICE

(75) Inventors: Rei-Yun Lee, Miao-Li (TW); Jung-Lung Huang, Miao-Li (TW)

(73) Assignee: Chimei InnoLux Corporation, Miaoli County (TW)

( * ) Notice: Subject to any disclaimer, the term of this patent is extended or adjusted under 35 U.S.C. 154(b) by 878 days.

(21) Appl. No.: 12/231,523

(22) Filed: Sep. 2, 2008

(65) Prior Publication Data
US 2009/0058840 A1  Mar. 5, 2009

(30) Foreign Application Priority Data
Aug. 31, 2007  (CN) .................. 2007 1 0076746

(51) Int. Cl.
*G02F 1/13*  (2006.01)

(52) U.S. Cl. ........................................ 349/187; 345/107
(58) Field of Classification Search .................. 349/187
See application file for complete search history.

(56) References Cited

U.S. PATENT DOCUMENTS

| 6,747,712 B2 * | 6/2004 | Noh et al. ................. 349/39 |
| 2006/0077330 A1 | 4/2006 | Ijzerman et al. |
| 2006/0221068 A1 | 10/2006 | Feenstra et al. |
| 2006/0285067 A1 * | 12/2006 | Kim ........................ 349/187 |

FOREIGN PATENT DOCUMENTS

| CN | 1754113 A | 3/2006 |
| CN | 1881003 A | 12/2006 |

* cited by examiner

*Primary Examiner* — Kevin M Nguyen
*Assistant Examiner* — Cory Almeida
(74) *Attorney, Agent, or Firm* — Li & Cai Intellectual Property (USA) Office

(57) ABSTRACT

An exemplary electro-wetting display (EWD) device (30) includes a first substrate (31), a second substrate (38), a driving circuit layer (32) provided on the second substrate, a plurality of partition walls (34), a first fluid (35) and a second fluid (36). The first and second fluids immiscible with each other are disposed between the driving circuit layer and the first substrate. The partition walls are provided on the driving circuit layer, thereby defining a plurality of pixel regions (R). Each pixel region has two short sides and two long sides. The second fluid is electro-conductive or polar and the first fluid is provided between the driving circuit layer and the second fluid. The driving circuit layer corresponding to each pixel region includes a pixel electrode (325) and a switch element (324) connected thereto. The pixel electrode is continuously disposed between the switch element and the two short sides.

20 Claims, 3 Drawing Sheets

ELECTRO-WETTING DISPLAY DEVICE

CROSS-REFERENCE TO RELATED APPLICATION

This application is related to, and claims the benefit of, a foreign priority application filed in China as Application No. 200710076746.0 on Aug. 31, 2007. The related application is incorporated herein by reference.

FIELD OF THE INVENTION

The present invention relates to an electro-wetting display (EWD) device including picture elements having first and second immiscible fluid within a space defined between a first substrate and a second substrate, the second fluid being electro-conductive or polar.

GENERAL BACKGROUND

EWD devices adjust the amount of light to be transmitted by means of electrocapillarity (electro-wetting). EWD devices display images with excellent brightness and contrast, and relatively low power consumption compared to many other display devices.

Referring to FIG. 6, this is a cross section view of part of a conventional EWD device before a voltage is applied thereto. The EWD device 10 includes a first substrate 11, a second substrate 18 facing towards the first substrate 11, an first fluid 15, a second fluid 16, a plurality of partition walls 14 and two support plates (not shown). The two support plates are provided between the two substrates 11, 18 for supporting the transparent substrate 11. Thereby, the two substrates 11, 18 and the two support plates define a sealed container (not labeled) to be filed with the first fluid 15 and the second fluid 16. A hydrophobic insulator 13, a driving circuit layer 12 and the second substrate 18 are stacked one on the other in that order from the top to the bottom. The partition walls 14 are arranged in a lattice on an inner surface of the hydrophobic insulator 13 thereby defining a plurality of pixel regions R. The first fluid 15 sealed within the sealed container corresponding to the pixel regions R is an opaque fluid. The second fluid 16 immiscible with the first fluid 15 is contacted to the first fluid 15 and filled in the sealed container.

Referring to FIG. 7, the driving circuit layer 12 includes an active driving circuit (not labeled) and a passivation layer (not shown) covering the active driving circuit. The active driving circuit includes a plurality of first driving lines 121 that are parallel to each other and that each extends along a first direction, a plurality of second driving lines 122 that are parallel to each other and that each extends along a second direction orthogonal to the first direction, a plurality of thin film transistors (TFTs) 124 that function as switching elements, and a plurality of pixel electrodes 125. The first driving lines 121 and the second driving lines 122 cross each other and correspond to the partition walls 14, thereby defining a plurality of rectangular areas (not labeled) corresponding to the pixel regions R. Each of the TFTs 124 is provided in the vicinity of a respective point of intersection of the first driving line 121 and the second driving line 122, and includes a gate electrode 126, a source electrode 127 and a drain electrode 128. The gate electrode 126, the source electrode 127 and the drain electrode 128 are connected to a corresponding first driving line 121, a corresponding second driving line 122, and a corresponding pixel electrode 125 respectively. Each pixel electrode 125 is continuously located on a remaining region of a corresponding rectangular region where no TFT 124 is present.

When no voltage is applied, the first fluid 15 extends over an entire area in a direction that is orthogonal to the direction in which light is transmitted. Therefore, the light is shielded by the first fluid 15 and the EWD device 10 displays a black image.

When a signal voltage is applied to one of the pixel electrodes 124 by the corresponding TFT 125 and a common voltage is applied to the second fluid 16, an electric field is generated between the second fluid 16 and the pixel electrode 125. On the other hand, a lower left hand corner of the rectangular region where the TFT 124 is present is a non electric field area, and thus the hydrophobic insulator 13 corresponding to the TFT 124 remains less wettable. As a result, an interface between the first fluid 15 and the second fluid 16 changes due to electrocapillarity, so that the first fluid 15 moves towards the lower left hand corner and the second fluid 16 contacts the hydrophobic insulator 13. Light emitted from the first substrate 18 passes through the second fluid 16, and the EWD device 10 displays a white image.

However, sometimes the EWD device 10 is not quick enough to shift from an off state to an on state, when the first fluid 15 moves towards the lower left hand corner.

What is needed, therefore, is an EWD device that can overcome the above-described deficiencies.

SUMMARY

In an exemplary embodiment, an electro-wetting display (EWD) device includes a first substrate, a second substrate facing the first substrate, a driving circuit layer provided on the second substrate, a plurality of partition walls, a first fluid and a second fluid. The first fluid and the second fluid immiscible with each other are disposed between the driving circuit layer and the first substrate. The partition walls are arranged in a lattice on the driving circuit layer, thereby defining a plurality of pixel regions. Each pixel region has two short sides and two long sides. The second fluid is electro-conductive or polar. The first fluid is provided between the driving circuit layer and the second fluid. The driving circuit layer corresponding to each pixel region includes a pixel electrode and a switch element connected thereto. The pixel electrode is continuously disposed between the switch element and the two short sides.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
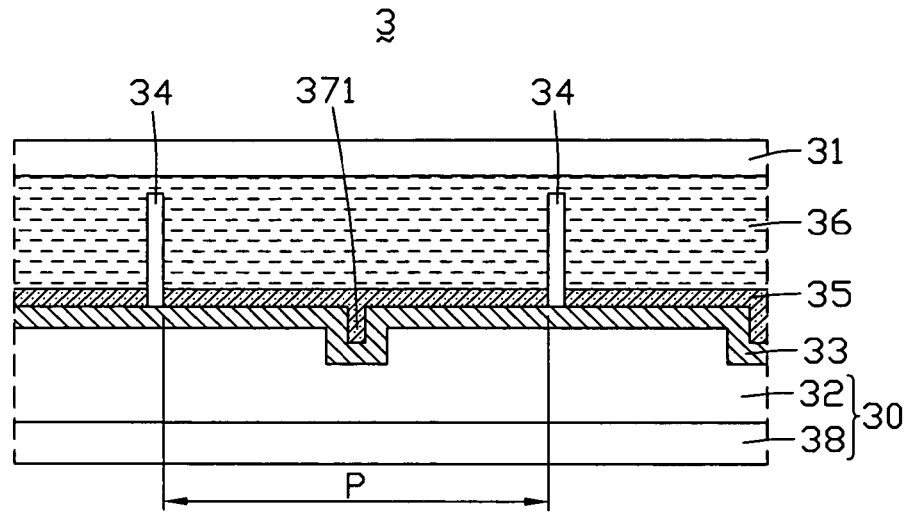
FIG. 1 is a cross section view of part of an EWD device according to an exemplary embodiment of the present invention, the EWD device including a driving circuit layer and a plurality of pixel regions.

FIG. 1 shows an EWD device 3 according to an exemplary embodiment of the present invention with no voltage applied thereto. The EWD device 3 includes a first substrate 31, a driving substrate assembly 30 facing towards the first substrate 31, a first fluid 35, a second fluid 36, a plurality of partition walls 34, a hydrophobic insulator 33 and two support plates (not shown). The two support plates are provided between the first substrate 31 and the driving substrate assembly 30 for supporting the first substrate 31. Thereby, the first substrate 31, the driving substrate assembly 30 and the two support plates define a sealed container (not labeled) to be filled with the first fluid 35 and the second fluid 36. The hydrophobic insulator 33 covers an inner surface of the driving substrate assembly 30. The partition walls 34 are arranged in a lattice on the hydrophobic insulator 33 thereby defining a plurality of pixel regions P. The first fluid 35 is sealed within the sealed container corresponding to the pixel regions P. The second fluid 36 immiscible with the first fluid 35 is filled in the space between the first fluid 35 and the first substrate 31. The first fluid 35 can be, for example, an alkane-like hexadecane or colored oil. In this exemplary embodiment, the first fluid 35 is a black oil. The second fluid 36 is electro-conductive or polar, for example, water or a salt solution (e.g. a solution of KCL in a mixture of ethyl alcohol). The hydrophobic insulator 33 can be made of an amorphous fluoropolymer (AF 1600).

The driving substrate assembly 30 includes a second substrate 38 and a driving circuit layer 32. The driving circuit layer 32 is located on an inner surface of the second substrate 38. In a center portion of each pixel region P of the driving circuit layer 32, a groove 371 penetrating perpendicular to the surface of and through the driving circuit layer 32 is provided. A depth of the groove 371 is less than a thickness of the driving circuit layer 32. The hydrophobic insulator 33 covers an inner surface of the groove 371 and the groove 371 with the hydrophobic insulator 33 constitutes a liquid storage space. The first fluid 35 is also filled in the liquid storage space.

Figure 2:
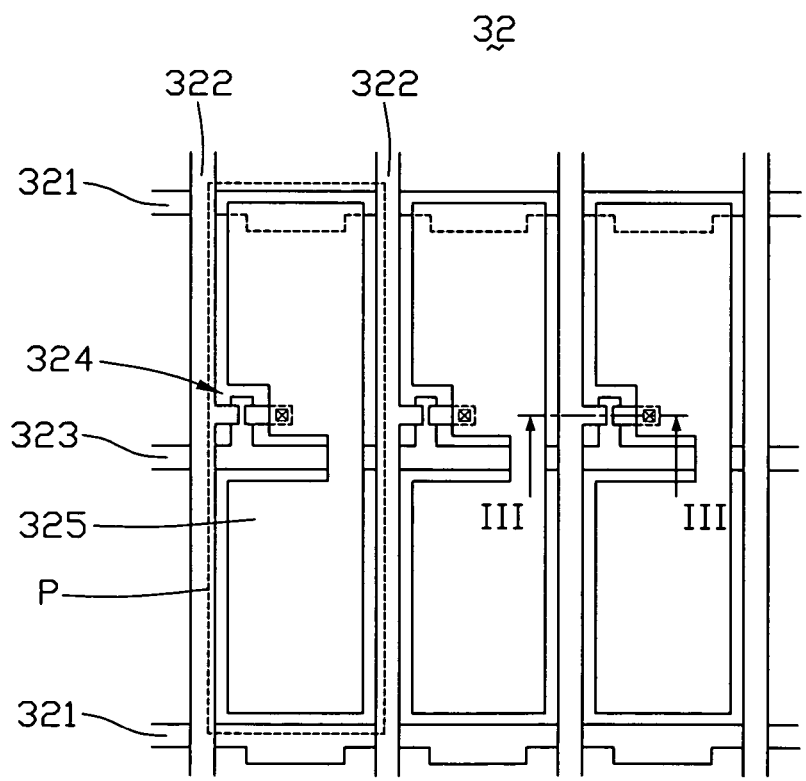
FIG. 2 is a top view of part of the driving circuit layer of FIG. 1.

FIG. 2 shows a top view of the driving circuit layer 32. The driving circuit layer 32 includes an active driving circuit (not labeled) located on an internal surface of the second substrate 38. The active driving circuit includes a plurality of parallel first driving lines 321 that each extends along a first direction, a plurality of parallel second driving lines 322 that each extends along a second direction orthogonal to the first direction, a plurality of third driving lines 323, a plurality of thin film transistors (TFTs) 324 that function as switching elements, and a plurality of pixel electrodes 325. The first driving lines 321 and the second driving lines 322 cross each other and correspond to the partition walls 34, thereby defining a plurality of rectangular areas (not labeled) corresponding to the pixel regions P. Each rectangular area includes two opposite short sides that respectively correspond to two adjacent first driving lines 321 and two opposite long sides that respectively correspond to two adjacent second driving lines 322. The third driving lines 323 are parallel to each other and respectively extend along center lines of the rectangular areas. Each of the TFTs 324 is provided at the intersection of a third driving line 323 and a corresponding second driving line 322. Each pixel electrode 325 is continuously located on a remaining region of a corresponding rectangular area where no TFT 324 is present.

Figure 3:
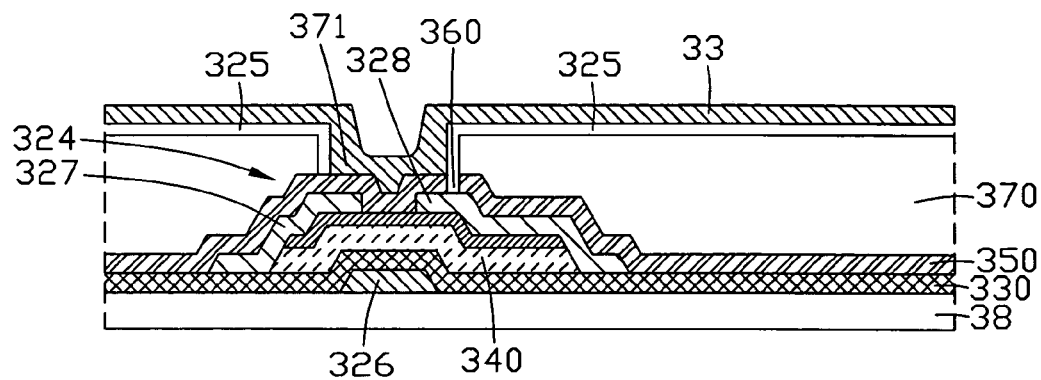
FIG. 3 is an enlarged, cross section view taken along line III-III of FIG. 2.

Referring also to FIG. 3, in each pixel region P, the TFT 324 of the driving circuit layer 32 further includes a gate electrode 326, a source electrode 327, a drain electrode 327, a gate electrode insulator 330, a semiconductor layer 340 and a passivation layer 350. The gate electrode 326 extending from the third driving line 323 is located on the inner surface of the second substrate 38. The gate electrode insulator 330 is formed over the second substrate 38 for covering the gate electrode 326. The semiconductor layer 340 is provided on a portion of the gate electrode insulator 330 that corresponds to the gate electrode 326. The source electrode 327 and the drain electrode 328 are respectively formed over the semiconductor layer 340 thereby partly overlapping with the semiconductor layer 340. Simultaneously, the source electrode 327 extends from the second driving line 322, and the drain electrode 328 is electrically connected to the pixel electrode 325 by a connecting hole 360. The passivation layer 350 covering the aforementioned structure is patterned to expose part of the drain electrode 328 thereby forming the connecting hole 360. The passivation layer 350 can be a silicon nitride layer, a silicon oxide layer or other dielectric material layer formed, for example, by conducting chemical vapor deposition. A colored coating layer 370 having a certain thickness is formed over part of the passivation layer 350 that corresponds a remaining region of the pixel region P where no gate electrode 326 is present, thereby forming the groove 371 above the gate electrode 326. Thus, the groove 371 provided above the TFT 324 is located at the center line of the rectangular region. The colored coating layer 370 is made of a color photo resist. The pixel electrode 325 covers the colored coating layer 370 and is filled in the connection hole 360 thereby being electrically connected to the drain electrode 328. The pixel electrodes 325 can be made of indium tin oxide (ITO) or indium zinc oxide (IZO).

Figure 4:
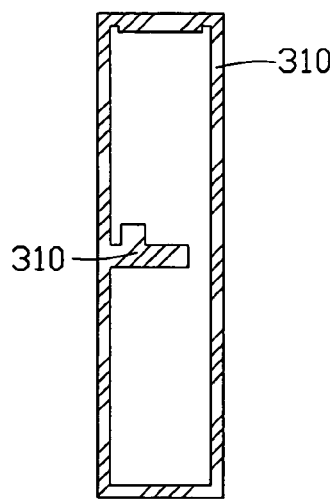
FIG. 4 is a top view of a black matrix corresponding to one pixel region employed in the EWD device of FIG. 1.

Referring to FIG. 4, because the colored coating layer 370 made of color photo resist serves as a color filter element, it just needs to provide a black matrix 310 on an inner surface of the first substrate 31. The black matrix 310 corresponds to the partition walls 34 and the TFTs 324.

When no voltage is applied between any pixel electrode 325 and the second fluid 36, a contact interface between the first fluid 35 and the second fluid 36 is roughly parallel to the surface of the second substrate 38. Therefore the colored coating layer 370 is covered by the first fluid 35. Light emitted from the second substrate 38 passes through the colored coating layers 370 and the hydrophobic insulator 33 in sequence, and then is absorbed or blocked by the first fluid 35. Thus, the EWD device 3 displays a black image.

Figure 5:
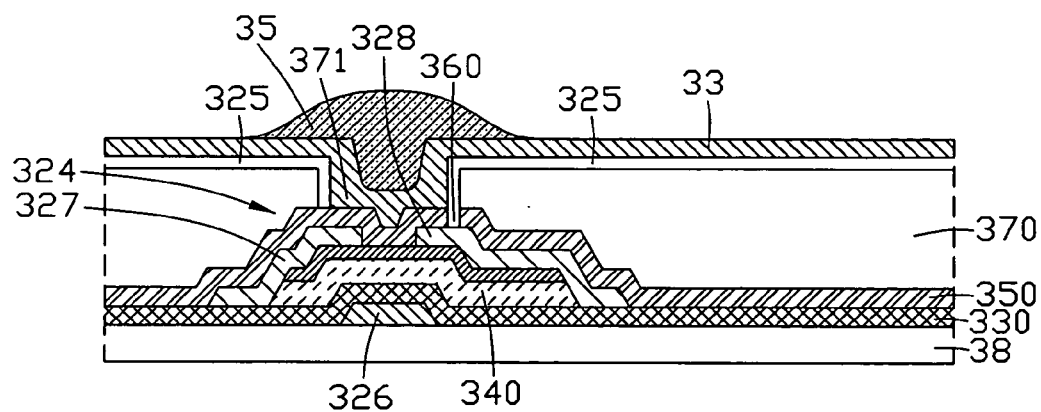
FIG. 5 illustrates a state when voltage signals are applied to the EWD device of FIG. 1.
Figure 6:
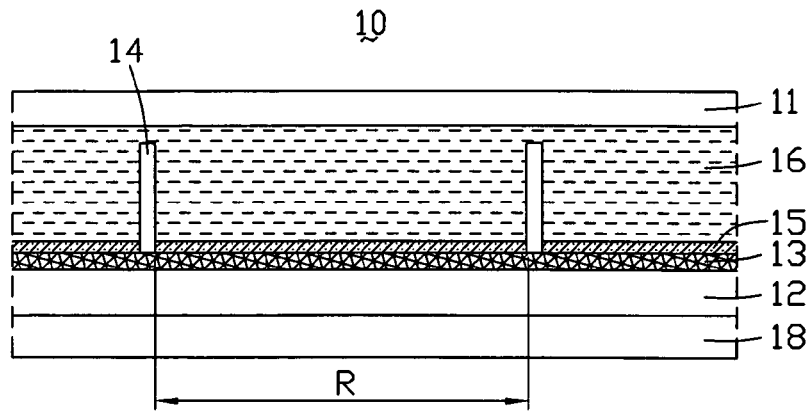
FIG. 6 is a cross section view of part of a conventional EWD device before a voltage is applied thereto, the conventional EWD device including a driving circuit layer.
Figure 7:
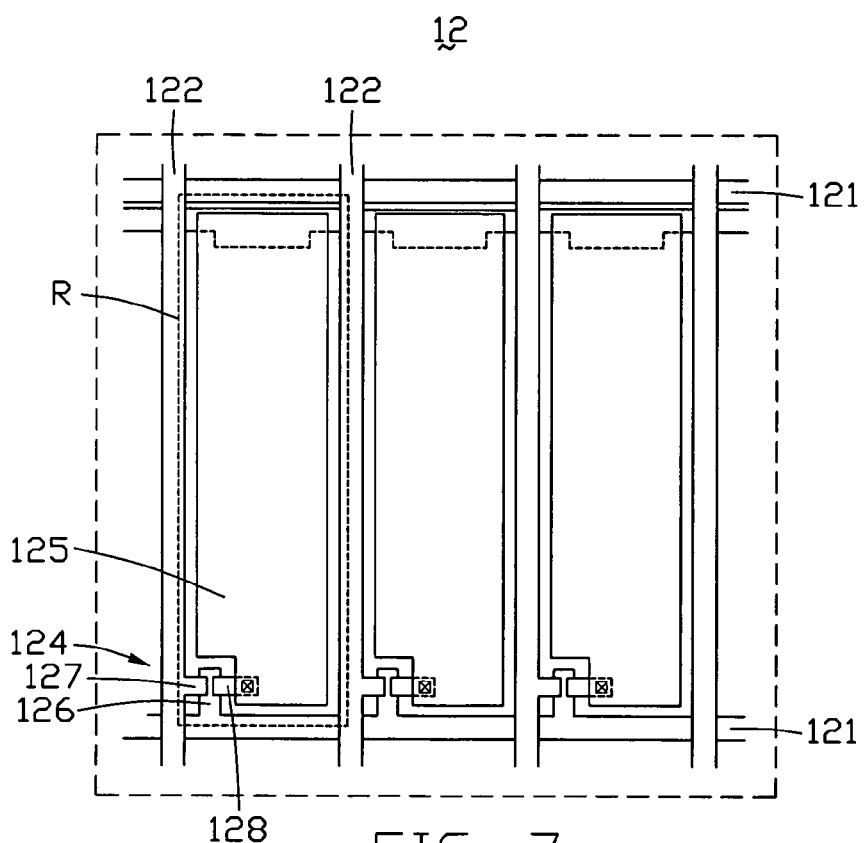
FIG. 7 is a top view of part of the driving circuit layer of FIG. 6.

Referring to FIG. 5, when scanning voltage signals are applied to the gate electrode 326 of the corresponding TFT 324 by the corresponding third driving line 323 to switch on the TFT 324, and data voltage signals are sequentially applied to the corresponding pixel electrode 325 by the corresponding second driving line 323, the corresponding source electrode 327 and the corresponding drain electrode 328. At the same time, a common voltage is applied to the second fluid 36, thereby generating an electric field between the second fluid 36 and the pixel electrode 325. On the other hand, a central position of the rectangular region where the TFT 324 is present is a non electric field area, and thus the hydrophobic insulator 33 corresponding to the TFT 324 remains less wettable. Therefore, an interface between the first fluid 35 and the second fluid 36 changes due to electrocapillarity, so that the first fluid 35 moves towards the central position and the second fluid 36 contacts the hydrophobic insulator 33. Light emitted from the second substrate 38 passes through the colored coating layer 371 and the hydrophobic insulator 33 and the second fluid 36 in sequence. The EWD device 3 displays a color image.

According to the embodiment described as above, when the electrical field is formed between the second fluid 36 and the pixel electrodes 325, the first fluid 35 moves from the two opposite short sides toward the central position of the rectangular region that corresponds to the pixel region P. This means a minimum movement distance of the first fluid 35 is obtained. Thus, the EWD device 3 has a relatively short response time.

Additionally, because the grooves 371 are simultaneously provided over the TFTs 324, the driving circuit layer 32 has a different thickness, and the first fluid 35 can converge more steadily at the central position due to gravity action.

Alternatively to the above embodiment, if the pixel electrode 325 can be continuously disposed between the TFT 324 and the two opposite short sides of the rectangular region, the movement distance that the first fluid 35 converges in a non electrical field region where the TFT 324 is present is shorter than the movement distance that the first fluid 35 moves from a short side opposite to the TFT towards a corner of the rectangular region where the TFT 324 is present. Thus, the response time of the EWD device 3 is reduced. Specially, if a distance ratio x/y is in a range of 2/3 to 3/2, the response characteristic of the EWD device can be improved, wherein x is a distance between the third driving line 323 and one of the two short sides; y is a distance between the driving line 323 and another short side. In addition, the EWD device 3 also can be a reflective or a transflective EWD device.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. An electro-wetting display (EWD) device, comprising:
    a first substrate;
    a second substrate facing and spaced apart from the first substrate;
    a driving circuit layer provided on the second substrate, the driving circuit layer comprising a plurality of pixel electrodes and a plurality of switch elements respectively connected to the pixel electrodes, a plurality of fluid converging grooves being recessively defined on an inner-exposing surface of the driving circuit layer;
    a plurality of partition walls arranged in a lattice on the driving circuit layer thereby defining a plurality of fluid holding regions,
        wherein each fluid holding region is rectangular, and from a top-down perspective of each fluid holding region, each fluid holding region comprises two short sides and two long sides, the switching element arranged underneath the fluid holding region along one of the two long sides about halfway between the two short sides,
        wherein each of the fluid converging grooves is arranged correspondingly above one of the plurality of switch elements and exposed in each of the corresponding fluid holding regions; and
    a first fluid and a second fluid, the first and second fluids being immiscible with each other and disposed between the driving circuit layer and the first substrate, the second fluid being electro-conductive or polar, the first fluid provided between the driving circuit layer and the second fluid.

2. The EWD device of claim 1, wherein the plurality of pixel electrodes are respectively continuously located on remaining regions of corresponding fluid holding regions where no switch elements are present.

3. The EWD device of claim 1, wherein the driving circuit layer further comprises a coating layer provided over the pixel electrodes and the switch elements.

4. The EWD device of claim 3, wherein each of the fluid converging groove penetrates into the coating layer in a thickness direction of the coating layer.

5. The EWD device of claim 4, wherein a depth of the fluid converging groove is less than a thickness of the driving circuit layer.

6. The EWD device of claim 4, wherein the coating layer is made of a color photo resist.

7. The EWD device of claim 4, further comprising a hydrophobic insulating layer disposed in the recessed inner-exposing surface of the fluid converging grooves and the driving circuit layer.

8. The EWD device of claim 1, wherein the driving circuit layer further comprises a plurality of driving lines configured for providing voltage signals to switch on corresponding switch elements, each of the driving lines located adjacent to the corresponding switch elements.

9. The EWD device of claim 1, further comprising a black matrix provided on an inner surface of the first substrate, wherein the black matrix corresponds to the plurality of partition walls and the switch elements.

10. An electro-wetting display (EWD) device, comprising:
    a first substrate;
    a second substrate facing and spaced apart from the first substrate;
    a driving circuit layer provided on the second substrate having a plurality of fluid converging grooves recessively defined on an inner-exposing surface thereof;
    a plurality of partition walls arranged in a lattice on the driving circuit layer, thereby defining a plurality of fluid holding regions, each fluid holding region having two short sides and two long sides; and
    a first fluid and a second fluid, the first and second fluids immiscible with each other and disposed between the driving circuit layer and the first substrate, the second fluid being electro-conductive or polar, the first fluid provided between the driving circuit layer and the second fluid;
    wherein the driving circuit layer corresponding to each fluid holding region comprises a pixel electrode and a switch element connected to the pixel electrode;
    wherein each of the fluid converging grooves is arranged correspondingly above one of the plurality of switch elements and exposed in each of the corresponding fluid holding region;
    wherein the pixel electrode in each fluid holding region comprises a first boundary parallel to the two long sides of the fluid holding region and a second boundary facing towards the first boundary, the second boundary includes a first segment parallel to the two long sides, a second segment substantially aligned with the first segment, and a third segment interconnecting the first segment and the second segment, the third segment recessed inward from the first and the second segments towards the first boundary to define an opening of the pixel electrode; and a position where the switch element is located corresponds to the opening.

11. The EWD device of claim 10, wherein a proportion of a distance between the switch element and one of the two short sides to a distance between the switch element and the other short side is in a range of 2/3 to 3/2.

12. The EWD device of claim 10, wherein a distance between the switch element and one of the two short sides is substantially equal to a distance between the switch element and the other short side.

13. The EWD device of claim 10, wherein the driving circuit layer further comprises a coating layer provided over the pixel electrodes and the switch elements.

14. The EWD device of claim 13, wherein each of the fluid converging groove penetrates into the coating layer in a thickness direction.

15. The EWD device of claim 13, wherein a depth of each of the fluid converging groove is less than a thickness of the driving circuit layer.

16. The EWD device of claim 13, wherein the coating layer is made of a color photo resist.

17. The EWD device of claim 14, further comprising a hydrophobic insulating layer is disposed on the recessed inner-exposing surface of the fluid converging grooves and the driving circuit layer.

18. The EWD device of claim 10, further comprising a black matrix provided on an inner surface of the first substrate, wherein the black matrix corresponds to the plurality of partition walls and the switch elements.

19. The EWD device of claim 10, wherein the opening is substantially disposed at a center region of the second boundary.

20. The EWD device of claim 10, wherein the driving circuit layer further comprises a plurality of driving lines configured for providing voltage signals to switch on corresponding switch elements, and each of the driving lines is arranged to pass through the opening of a corresponding one of the pixel electrodes.

* * * * *